United States Patent Office 3,679,639
Patented July 25, 1972

3,679,639
CURABLE COMPOSITIONS OF AN UNSATURATED BIS-AMIDE, A DIAMINE, AND A MULTICYCLIC AROMATIC COMPOUND
Michel Bargain, Lyon, Max Gruffaz, Le Mulatiere, Serge Laurent, Bron, and Maurice Mallet, Lyon, France, assignors to Rhone-Poulenc S.A., Paris, France
No Drawing. Filed Apr. 16, 1970, Ser. No. 29,286
Claims priority, application France, Apr. 18, 1969, 6912222
Int. Cl. C08g 20/00
U.S. Cl. 260—78 U                    8 Claims

ABSTRACT OF THE DISCLOSURE

Compositions curable by heating to give resins of good heat resistance comprise (a) a prepolymer of an N,N'-bis-imide of an unsaturated dicarboxylic acid and a diamine and (b) an aromatic compound of 2 to 3 benzene rings.

This invention relates to curable compositions and their production and use.

French Pat. No. 1,555,564 describes heat-curable resins obtained by reacting an N,N'-bis-imide of an unsaturated dicarboxylic acid of the formula:

$$D\begin{array}{c}CO\\ \diagdown\\ CO\end{array}N-A-N\begin{array}{c}CO\\ \diagdown\\ CO\end{array}D$$

in which D represents a divalent radical containing a carbon-carbon double bond and A is a divalent radical containing at least two carbon atoms, with a diprimary diamine of the formula:

$$H_2N-B-NH_2$$

in which B represents a divalent radical of not more than 30 carbon atoms. The amounts of N,N'-bis-imide and of diamine are so chosen that the ratio $$\frac{\text{No. of mols of bis-imide (I)}}{\text{No. of mols of diamine (II)}}$$

is at least equal to 1; it is also generally preferred that the ratio should be less than 50. Heat-resistant resins are obtained, which are remarkably resistant to severe heat stresses.

It is also indicated in French Pat. 1,555,564 that these resins can be prepared in bulk, by heating the previously intimately mixed reagents, or in an inert polar diluent such as dimethylformamide, N-methylpyrrolidone or dimethylacetamide, it being possible to use the latter process where, for example, it is necessary to use a solution of the polymer formed.

Finally, it is mentioned in the said patent that for numerous uses it is advantageous to carry out the process in two steps. In a first stage, a prepolymer is prepared by heating an intimate mixture of the two reagents of Formulae I and II to a temperature of the order of 100° to 250° C. The resulting prepolymer can be used in the form of a solution, a suspension or a powder, or can also be shaped by simple casting while hot. In a second stage, the curing of the prepolymer can be brought about by further heating to temperatures of the order of 350° C., optionally under pressure.

The present invention provides compositions which can be cured to give heat-resistant resins, comprising (a) a prepolymer obtained by heating an N,N'-bis-imide of the formula:

$$D\begin{array}{c}CO\\ \diagdown\\ CO\end{array}N-A-N\begin{array}{c}CO\\ \diagdown\\ CO\end{array}D \quad (I)$$

in which D represents a divalent organic radical containing a carbon-carbon double bond and A represents a divalent organic radical containing at least two carbon atoms, with a diprimary diamine of the formula:

$$H_2N-B-NH_2 \quad (II)$$

in which B represents a divalent organic radical of not more than 30 carbon atoms, and (b) an aromatic compound containing 2 to 4 benzene rings, which does not sublime or boil at atmospheric pressure up to 250° C.

The radical D is derived from an anhydride of a dicarboxylic ethylenic acid of the formula:

$$D\begin{array}{c}CO\\ \diagdown\\ CO\end{array}O \quad (III)$$

which can be, for example, maleic anhydride, citraconic anhydride, itaconic anhydride, pyrocinchonic anhydride, tetrahydrophthalic anhydride, dichloromaleic anhydride as well as the Diels-Alder reaction products of one of these anhydrides with an acyclic, alicyclic or heterocyclic diene, e.g. cyclopentadiene. As regards the anhydrides resulting from a diene synthesis, reference can for example be made to volume IV of the work entitled "Organic Reactions" (John Wiley and Sons, Inc.).

The symbols A and B may be identical or different and may represent linear or branched alkylene radicals having less than 13 carbon atoms or a phenylene, cyclohexylene,

[structures shown] radical

The symbols A and B can also contain several phenylene or cyclohexylene radicals linked to one another by a simple valency bond or by an inert atom or group, such as —O—, —S—, an alkylene grouping having 1 to 3 carbon atoms,

—CO—, —SO$_2$—, NR$_1$—, —N=N—, —CONH—
—COO—, —P(O)R$_1$—, CONH—X—NHCO—

[structures shown]

wherein R$_1$ represents a hydrogen atom, an alkyl radical having 1 to 4 carbon atoms or a phenyl or cyclohexyl radical, and X represents an alkylene radical having fewer than 13 carbon atoms or a phenylene or cyclohexylene radical. The various phenylene or cyclohexylene radicals can furthermore be substituted by methyl groupings.

By way of specific examples of bis-imides (I) there may be mentioned:

N,N'-ethylene-bis-maleimide,
N,N'-hexamethylene-bis-maleimide,
N,N'-metaphenylene-bis-maleimide,
N,N'-paraphenylene-bis-maleimide,
N,N'-4,4'-diphenylmethane-bis-maleimide,
N,N'-4,4'-diphenylether-bis-maleimide,
N,N'-4,4'-diphenylsulphone-bis-maleimide,
N,N'-4,4'-dicyclohexylmethane-bis-maleimide,
N,N'-α,α'-4,4'-dimethylenecyclohexane-bis-maleimide,
N,N'-meta-xylylene-bis-maleimide,
N,N'-4,4'-diphenylcyclohexane-bis-maleimide,
N,N'-metaphenylene-bis-tetrahydrophthalimide and
N,N'-4,4'-diphenylmethane-bis-citraconimide.

These bis-imides can be prepared by the method described in U.S. Pat. No. 2,444,536 for the preparation of N-arylmaleimides.

Examples of diamines (II) which can be used are 4,4'-diamino-dicyclohexylmethane,
1,4-diamino-cyclohexane,
2,6-diamino-pyridine,
meta-phenylenediamine,
para-phenylenediamine,
4,4'-diamino-diphenylmethane,
2,2-bis(4-aminophenyl)propane,
benzidine,
4,4'-diaminophenyl oxide,
4,4'-diaminodiphenylsulphide,
4,4'-diaminodiphenylsulphone,
bis(4-aminophenyl)methylphosphine oxide,
bis(4-aminophenyl)phenylphosphine oxide,
bis(4-aminophenyl)methylamine,
1,5-diaminonaphthalene,
meta-xylylenediamine,
para-xylylenediamine,
1,1-bis(para-aminophenyl)phthalene,
hexamethylenediamine,
6,6'-diamino-2,2'-dipyridyl,
4,4'-diaminobenzophenone,
4,4'-diaminoazobenzene,
bis(4-aminophenyl)phenylmethane,
1,1-bis-(4-aminophenyl)-cyclohexane,
1,1-bis(4-amino-3-methylphenyl)-cyclohexane,
2,5-bis(m-aminophenyl)-1,3,4-oxadiazole,
2,5-bis(p-aminophenyl)-1,3,4-oxadiazole,
2,5-bis(m-aminophenyl)-thiazolo(4,5-d)thiazole,
5,5'-di(m-aminophenyl)-(2,2')-bis-(1,3,4-oxadiazolyl),
4,4'-bis(p-aminophenyl)-2,2'-bithiazole,
m-bis(2-(4-p-aminophenyl)thiazolyl)benzene,
2,2'-bis(m-aminophenyl)-5,5'-dibenzimidazole,
4,4'-diaminobenzanilide,
phenyl-4,4'-diaminobenzoate,
N,N'-bis(4-aminobenzoyl)p-phenylenediamine, and
3,5-bis(m-aminophenyl)-4-phenyl-1,2,4-triazole.

To prepare the prepolymer (a), the amounts of bis-imide (I) and of diamine (II) are so chosen that the ratio $$\frac{\text{No. of mols of bis-imide}}{\text{No. of mols of diamine}}$$

is greater than 1 and is preferably between 1.2 and 50, preferably between 1.3 and 5.

The preparation of the prepolymer can be effected by heating the reagents, preferably at between 50 and 250° C. The reagents can be subjected beforehand to intimate mixing which can, depending on the physical state of the reagents in question, consist of applying the usual techniques for mixing finely divided solids or of dissolving or dispersing one of the reagents in the other, kept in the liquid state. The bis-imide and the diamine can also be heated in a chemically inert solvent such as cresol, dimethylformamide, N-methylpyrrolidone, dimethylacetamide or chlorobenzene.

In the aromatic compound (b), the benzene rings can form condensed nuclei, or they can be linked to one another by a valency bond or by an inert atom or group such as

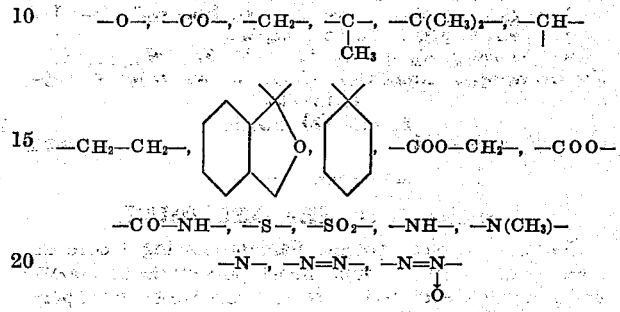

it being understood that in any particular compound the overall association of the rings can occur by a combination of these various types of association.

The benzene rings can be substituted by inert radicals such as —CH$_3$, —OCH$_3$, —F, —Cl and —NO$_2$.

Amongst the aromatic compounds (b) there may especially be quoted the isomeric terphenyls, the chlorinated diphenyls, diphenyl oxide, 2,2'-dinaphthyl oxide, di-o-methoxyphenyl oxide, benzophenone, 2,5,4' - trimethylbenzophenone, p-phenylbenzophenone, p-fluorobenzophenone, diphenylamine, diphenylmethylamine, triphenylamine, azobenzene, 4,4' - dimethyl-azobenzene, azoxybenzene, diphenylmethane, 1,1 - diphenylethane, 1,1-diphenylpropane, triphenylmethane, diphenylsulphone, diphenylsulphide, 1,2 - diphenylethane, p-diphenoxybenzene, 1,1 - diphenylphthalane, 1,1-diphenylcyclohexane, phenyl benzoate, benzyl benzoate, p-nitrophenyl terephthalate, benzanilide and phenanthrene.

The compositions according to the invention can contain up to 25%, and preferably 2% to 20%, by weight of the aromatic compound (b).

The new compositions can be prepared by producing an intimate mixture of the prepolymer (a) and the aromatic compound (b). Depending on the physical characteristics of the ingredients, this operation can consist of applying the usual techniques for mixing finely divided solids or of dissolving or suspending the aromatic compound (b) in the prepolymer, kept in the liquid state, optionally in one of the chemically inert solvents mentioned above.

In accordance with a preferred technique, the prepolymer is formed in situ during the preparation of the composition. For example, the mixture of the precursors of the prepolymer and the aromatic compound (b) can be heated to 50° to 250° C. for from several minutes to several hours. It is advantageous to heat the mixture until a homogeneous liquid is obtained which can be used as such, for example shaped by simple casting whilst hot, or can be used after cooling and reduction to the powder state, for example to produce compression-moulded articles.

Regardless of the shaping method employed, the compositions can be cured by heating to temperatures of the order of 350° C. and generally from 150° to 350° C.

Compared with prepolymers devoid of the aromatic compound (b), the compositions according to the invention yield articles which, after curing, are even more resistant to heat stresses of long duration. This is particularly noticeable in the case of articles compression-moulded from powders.

The use of the aromatic compounds (b) is also of interest for producing compositions which are intended to be shaped in the liquid state, because they allow the period during which the prepolymer can be used in the fused state to be extended. This advantage is of great value in certain techniques, especially for moulding by casting. At the same time, the resins obtained after curing are still remarkably resistant to heat stresses.

The examples which follow illustrate the invention.

EXAMPLE 1

A composition is prepared by intimately mixing 89.5 g. of N,N'-4,4'-diphenylmethane-bis-maleimide with 19.8 g. of bis(4-aminophenyl)methane and 5.8 g. of terphenyl containing 75% of meta-isomer and 25% of ortho-isomer, by weight, and then heating this mixture to 160° C. for 20 minutes.

After cooling, the composition is ground and placed in a cylindrical mould (diameter, 76 mm.; height, 6 mm.). The mould is placed between the platens of a press previously heated to 250° C. and the whole is compressed under a pressure of 150 kg./cm.$^2$. After 1 hour, the article is removed from the mould while hot and then cut into samples (length, 37.5 mm.; width, 9.57 mm.) which at 25° C. show a flexural breaking strength of 13.6 kg./mm.$^2$ for a span of 25.4 mm. After heating for 2000 hours at 250° C., this strength is still 12.9 kg./mm.$^2$.

If the process is carried out without terphenyl under otherwise identical conditions, the article has a strength of 9.9 kg./mm.$^2$ after the same heating period.

EXAMPLE 2

This example illustrates the influence of various polycyclic aromatic compounds on the variation in the viscosity of homogeneous compositions prepared from 26.85 g. of N,N'-4,4'-diphenylmethane-bis-maleimide and 5.94 g. of bis(4-aminophenyl)methane and the aromatic compound used at the rate of 3.64 g. or 8.19 g., respectively representing 10% and 20% by weight based on the total weight of the composition.

The various operations are carried out under otherwise identical conditions. In each operation, the container containing the mixture is heated in a fluid kept at 150° C.; the mixture melts and its viscosity then increases gradually as a function of the time. For each additive in question, the time Δt is determined which elapses between starting the heating and the moment at which the viscosity of the mixture reaches 10 poises. The precision of the test is of the order of half a minute.

This example also shows that the mechanical properties of the moulded articles obtained from compositions containing these aromatic compounds remain excellent following heat stresses of long duration. These articles were obtained by casting the composition in a mould heated to 200° C.; the whole then being kept at this temperature for 2 hours; the article was removed from the mould at 150° C. and then subjected to a supplementary heat treatment of 48 hours at 250° C.

Table 1 summarises the results obtained.

EXAMPLE 3

This example also illustrates the influence of various polycyclic aromatic compounds on the change in the viscosity of homogeneous compositions prepared from 5.37 g. of N,N'-4,4'-diphenylmethane-bis-maleimide, 1.186 g. of bis(4-aminophenyl)methane and the aromatic compound used at the rate of 0.72 g., representing 10% by weight relative to the weight of the composition.

The conditions under which the operations are carried out are otherwise identical to those described in Example 2.

Table 2 summarises the results obtained.

TABLE 2

| Nature of the aromatic compound: | Δt (mins.) |
|---|---|
| Without aromatic compound | 13 |
| Benzyl benzoate | 22 |
| Chlorinated diphenyls [1] | 21 |
| Benzanilide | 26 |
| Triphenylamine | 30 |
| N-methyldiphenylamine | 27 |
| Triphenylmethane | 27 |
| Diphenyl oxide | 29 |
| Azobenzene | 46 |

[1] Mixture of chlorinated diphenyls marketed under the name "Pyralene 1199."

We claim:
1. A composition comprising:
(a) a prepolymer obtained by heating at a temperature from 50 to 250° C. a bis-imide selected from the group consisting of N,N'-ethylene-bis-maleimide, N,N'-hexamethylene-bis-maleimide, N,N - metaphenylene-bis-maleimide, N,N'-paraphenyl-bis-maleimide, N,N' - 4,4' - diphenyl-methane-bis-maleimide, N,N-4,4'-diphenylether-bis-maleimide, N,N' - 4,4'dicyclohexylmethane-bis-maleimide, N,N'-α,α'-4,4'-dimethylenecyclohexane-bis-maleimide, N,N'-metaxylyene-bis-maleimide, N,N'-4,4'-diphenylcyclohexane - bis-maleimide, N,N' - metaphenylene - bis - tetrahydrophthalimide, N,N'-4,4'-diphenylsulphone - bis - maleimide, and N,N'-4,4'-diphenylmethane-bis-citraconimide, with a diamine selected from the group consisting of 4,4'-diamino-dicyclohexylmethane, 1,4-diamino-cyclohexane, 2,6-diamino-pyridine, meta-phenylenediamine, para-phenylene-diamine, 4,4'-diamino-diphenylmethane, 2,2 - bis(4-amino-phenyl) propane, benzidine, 4,4'-diaminophenyl oxide, 4,4'-diaminodiphenylsulphide, 4,4'-diaminodiphenylsulphone, bis-(4 - aminophenyl)methylphosphine oxide, bis(4-aminophenyl)phenylphosphine oxide, bis(4-aminophenyl)methylamine, 1,5-diamino-naphthalene, meta-xylylenediamine, para-xylylenediamine, 1,1-bis(para-aminophenyl)phthalane, hexamethylenediamine, 6,6'-diamino-2,2'-dipyridyl, 4,4'-diaminobenzophenone, 4,4'-diaminoazobenzene, bis(4-aminophenyl)phenylmethane, 1,1-bis-(4-aminophenyl)-cyclohexane, 1,1-

TABLE 1

| Nature of the aromatic compound | Proportion, percent | Δt, mins. | Flexural breaking strength, kg./mm.$^2$ | | |
|---|---|---|---|---|---|
| | | | Initial | After 736 hrs. at 250° C. | After 1,500 hrs. at 250° C. |
| Without aromatic compound | | 13 | 11.1 | 14.5 | 11.3 |
| Diphenylmethane | 10 / 20 | 25 / 63 | 10 | 14 | 12.2 |
| Diphenylamine | 10 / 20 | 20 / 54 | 16.8 | 15.1 | 14 |
| Phenanthrene | 10 / 20 | 25 / 47 | 9.2 | 13.3 | 12.2 |
| 2,5,4'-trimethylbenzophenone | 10 / 20 | 20 / 40 | 14.4 | 13.6 | 13.6 |
| Terphenyl [1] | 10 | 30 | 11.2 | 13.5 | 12.4 |

[1] Mixture containing 13% of ortho-isomer, 62% of meta-isomer and 25% of para-isomer, by weight.

bis(4 - amino-3-methylphenyl)-cyclohexane, 2,5-bis (m-aminophenyl - 1,3,4 - oxadiazole, 2,5-bis(p-aminophenyl)-1,3,4-oxadiazole, 2,5 - bis(m-aminophenyl)-thiazolo(4,5 - d)thiazole, 5,5' - di(m-aminophenyl)-(2,2')-bis-(1,3,4-oxadiazolyl), 4,4'-bis(p-aminophenyl)-2,2'-bithiazole, m-bis(2-(4-p-aminophenyl) thiazolyl)benzene, 2,2'-bis-(m-aminophenyl) - 5,5' - dibenzimidazole, 4,4'-diaminobenzanilide, phenyl, 4,4'-diaminobenzoate, N,N'-bis(4-aminobenzoyl)p-phenylenediamine, and 3,5-bis(m-aminophenyl)-4-phenyl-1,2,4-triazole; and (b) an aromatic compound containing 2 to 4 benzene rings, which does not sublime or boil at atmospheric pressure up to a temperature of 250° C., in which the benzene rings are condensed or are linked to one another by a valency bond or by a group selected from:

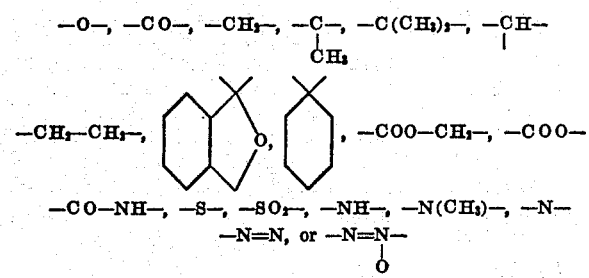

the benzene rings being unsubstituted or substituted by methyl, methoxy, fluorine, chlorine or nitro radicals, the proportion by weight of said aromatic compound being from 2% to 20%.

2. A composition according to claim 1 in which the aromatic compound is an isomeric terphenyl, a chlorinated diphenyl, diphenyl oxide, 2,2'-dinaphthyl oxide, di-o-methoxyphenyl oxide, benzophenone, 2,5,4'-trimethylbenzophenone, p-phenylbenzophenone, p-fluorobenzo-phenone, diphenylamine, diphenylmethylamine, triphenylamine, azobenzene, 4,4'-dimethyl-azobenzene, azoxybenzene, diphenylmethane, 1,1-diphenylethane, 1,1-diphenylpropane, triphenylmethane, diphenylsulphone, diphenylsulphide, 1,2-diphenylethane, p-diphenoxybenzene, 1,1-diphenylphthalene 1,1-diphenylcyclohexane, phenyl benzoate, benzyl benzoate, p-nitrophenyl terephthalate, benzanilide or phenanthrene.

3. A cured product obtained by heating a composition as claimed in claim 2 at 150° to 350° C.

4. A composition according to claim 1 in which the ratio of said bis-imide to said diamine is from 1.3:1 to 5:1.

5. A composition according to claim 1 in which the prepolymer is obtained from N,N'-4,4'-diphenylmethane-bis-maleimide and 4,4'-diamino-diphenylmethane.

6. A composition according to claim 1 in which the aromatic compound is a terphenyl.

7. A composition according to claim 1 made by heating the said N,N'-bis-imide with the said diamine in the presence of the said aromatic compound at 50° to 250° C.

8. A cured product obtained by heating a composition as claimed in claim 1 at 150° to 350° C.

References Cited

UNITED STATES PATENTS

| | | | |
|---|---|---|---|
| 2,550,650 | 4/1951 | Arnold | 260—33.8 |
| 3,384,615 | 5/1968 | Agovri et al. | 260—45.9 |
| 3,418,267 | 12/1968 | Busse | 260—33.8 |
| 3,452,056 | 6/1969 | Sundholm | 260—45.9 |
| 3,562,223 | 2/1971 | Bargain et al. | 260—78 |
| 3,533,996 | 10/1970 | Grundschober et al. | 260—78 X |

OTHER REFERENCES

Encyclopedia of Chemical Technology, Kirk et al., pp. 289–295, 1964.

HOWARD E. SCHAIN, Primary Examiner

U.S. Cl. X.R.

260—47 CP, 47 CZ; 264—331